United States Patent [19]

Ferenc et al.

[11] Patent Number: 4,731,785
[45] Date of Patent: Mar. 15, 1988

[54] COMBINED CIRCUIT SWITCH AND PACKET SWITCHING SYSTEM

[75] Inventors: James J. Ferenc; Robert W. Gebhardt, both of Boulder; Gary J. Grimes, Thornton; Edward B. Morgan, Jr., Boulder; Gabe A. Sellers, III, Northglenn, all of Colo.

[73] Assignees: American Telephone and Telegraph Company; AT&T Information Systems Inc., both of Holmdel, N.J.

[21] Appl. No.: 876,613

[22] Filed: Jun. 20, 1986

[51] Int. Cl.⁴ .................... H04Q 11/04; H04J 3/02; H04J 3/24
[52] U.S. Cl. .................................. 370/60; 370/85; 370/94
[58] Field of Search ............... 370/60, 94, 110.1, 85, 370/89; 340/825.5

[56] References Cited

U.S. PATENT DOCUMENTS

| | | | |
|---|---|---|---|
| 3,988,545 | 10/1976 | Kuemmerle et al. | 179/15 BV |
| 4,154,983 | 5/1979 | Pedersen | 370/89 |
| 4,535,448 | 8/1985 | Baxter et al. | 370/94 |
| 4,539,676 | 9/1985 | Lucas | 370/94 |
| 4,569,041 | 2/1986 | Takeuchi et al. | 370/94 |

Primary Examiner—Douglas W. Olms
Assistant Examiner—Frank M. Scutch, III
Attorney, Agent, or Firm—Donald M. Duft

[57] ABSTRACT

Apparatus for and a method of inserting circuit switch information and packetized data into different time slots of a time division multiplexed bus. A memory having a location individual to each time slot is written with information specifying whether the time slot individual to each location is to serve circuit switch information or packet data. The readout of each memory location during the occurrence of it's associated time slot controllably effects the application of either the circuit switch information or the packet data to the bus. Packet data can be inserted into each time slot not currently being used by the circuit switch. A special information bit is inserted into each time slot to specify whether the remainder of the bits of the time slot represents circuit switch or packet information. The information bit is used by receiving apparatus to steer the bits of each time slot to either a receiving circuit switch or a receiving packet switch.

25 Claims, 7 Drawing Figures

TRANSMITTER 101

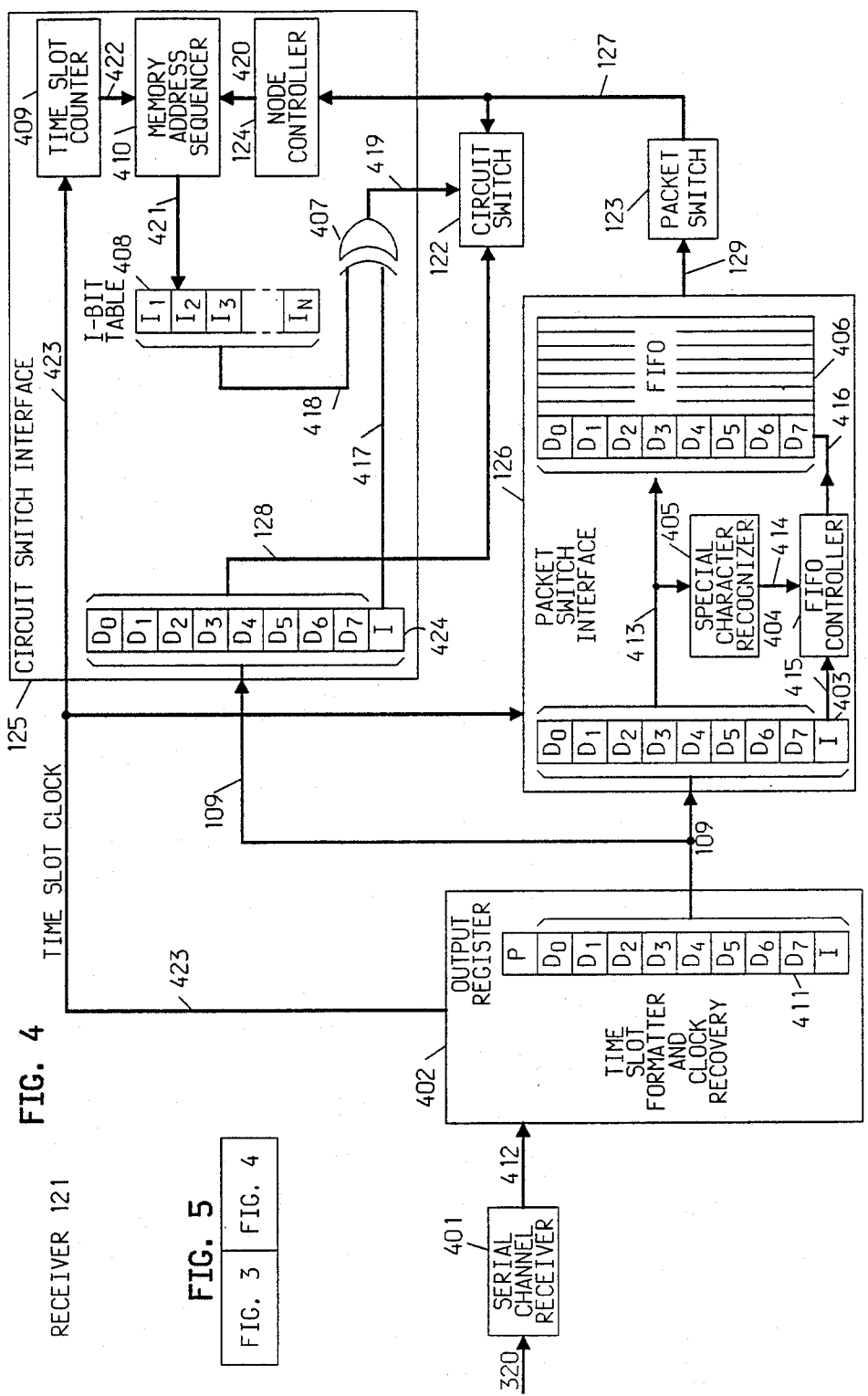

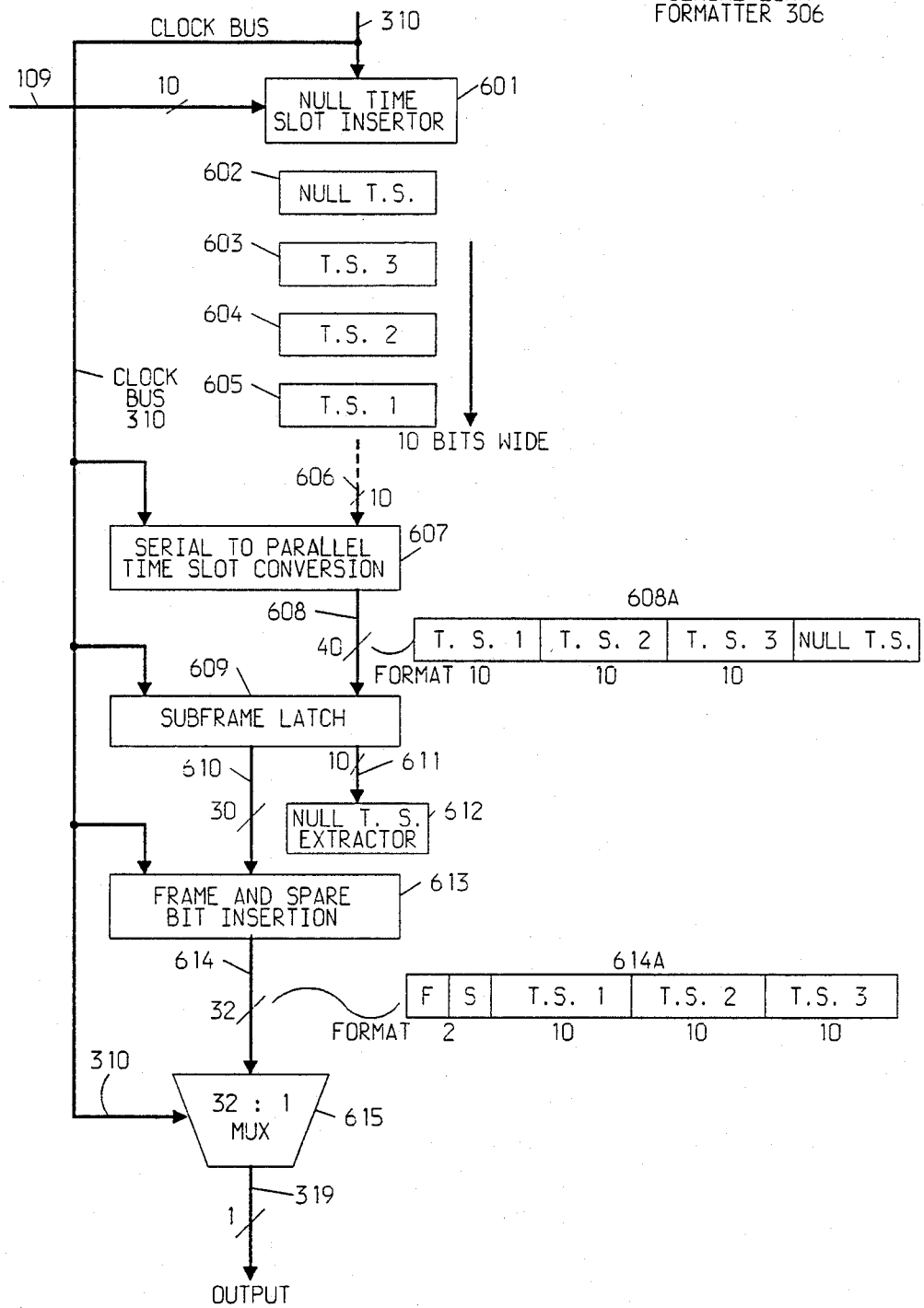

COMBINED CIRCUIT SWITCH AND PACKET SWITCHING SYSTEM

TECHNICAL FIELD

This invention relates to apparatus and a method for transmitting different types of information from a first to a second location. More particularly, this invention relates to facilities for transmitting both circuit switch and packet information over a common time division multiplexed digital path.

PROBLEM

It is often desirable to transmit both circuit switch information and packet data concurrently over a common path in time division multiplexed (TDM) form from a first to a second location. The circuit switch information is transmitted in certain time slots of the TDM path and the packet data is transmitted in the time slots that do not contain circuit switch information.

It is desirable to operate systems of this type using a dynamic time slot assignment mechanism which provides for flexibility in assigning time slots to the two different types of traffic. However, it has theretofore been a problem in systems that provide dynamic time slot assignment to transmit time slot assignment information to the receiving end, using uncomplicated and inexpensive protocols, specifying the type of traffic to which each time slot is assigned.

A dynamic time slot control arrangement is shown in U.S. Pat. No. 3,988,545. This patent discloses a method using a multiplexer which combines circuit switch synchronous information and asynchronous packet data together for transmission over a common TDM channel. The control circuitry of U.S. Pat. No. 3,988,545 looks at successive TDM frames to determine the present availability of enough idle contiguous times slots to accommodate the size of a packet waiting to be transmitted. Thus, if a large packet is waiting to be transmitted, the control circuitry attempts to find a block of contiguous idle time slots of adequate length to transmit the entirety of the large packet. If a sufficient number of idle contiguous time slots are not available, the control circuitry, as a last resort, breaks up the packet and transmits it by a complex arrangement that does not use all idle time slots.

U.S. Pat. No. 3,988,545 illustrates the problem of synchronizing the transmitter and the receiver so that circuit switch information is not interpreted by the receiver as packet information and vice versa. Synchronization of time slot usage is accomplished on a frame by frame basis in the system of this patent. A complex multiplexing arrangement is required since the multiplexed data and the synchronization information are transmitted in separate fields of the multiplexed path.

While the circuitry of U.S. Pat. No. 3,988,545 may be adequate to perform its intended function, it is unduly complicated in many respects including the circuitry used to transmit information to the receiving end regarding the type of traffic to which each time slot is assigned.

SOLUTION

The present invention solves the above described problems and deficiencies of the prior art and a technical advance is achieved by the provision of a method and apparatus, including control circuitry, for transmitting circuit switch and packet data from a first to a second location over a single TDM path. The control circuitry transmit each packet by inserting the packet on a byte by byte basis in each and every successive time slot that is not currently used by the circuit switch. The control circuitry identifies the time slots which contain packet data by inserting an information represented by the other bits of the time slot. This control arrangement eliminates the need for complex time slot assignment circuitry at both the transmitting and receiving end.

This disclosed facilities provide an improvement over the system of U.S. Pat. No. 3,988,545 in that an analysis of successive TDM frames and the idle time slot patterns of these frames is not required for the controller to assign packet traffic to idle time slots when packet traffic is waiting to be transmitted. Another advantage is that the controller is not required to determine the size of a packet waiting to be transmitted and then, find a sufficient number of contiguous idle time slots to accommodate the packet.

In greater detail, a time slot driven multiplexer having two inputs is provided at the transmitting end. One input of the multiplexer receives a TDM signal from the circuit switch with circuit switch information being contained in some, but not all, of the TDM time slots. The other multiplexer input receives packet data. The operative state of the multiplexer is instantaneously controlled on a time slot basis by an n by 1 memory where n equals the number of time slots in each TDM frame. The n by 1 memory is written with information supplied by the circuit switch indicating which time slots are currently being used by the circuit switch and which time slots are idle. The memory advances from position to position on a time slot driven basis and the current contents of each memory position i.e., a 0 or a 1, causes the multiplexer to either activate its circuit switch input or its packet data input.

Packet data is transmitted in this manner with each packet byte being transmitted immediately upon the availability of an idle time slot as indicated by the storage of a 1 in the n by 1 memory location associated with the time slot. In this manner, a packet of y bytes is transmitted during the occurrence of the first y time slots that are not presently being used for circuit switch information. It is irrelevant whether these y time slots are contiguous.

The control circuitry at the transmitting end inserts an I bit representing time slot identity information into each transmitted time slot to indicate to the receiving end whether the other bits of the time slot represent circuit switch or packet information. For time slots containing circuit switch information, the I bit is inserted by circuitry which is intermediate the circuit switch and the multiplexer input that serves the circuit switch. The circuitry that inserts the I bit into time slots containing packet data is intermediate the packet switch and the input of the multiplexer that serves the packet data. This I bit insertion circuitry is controlled by the n by 1 memory.

In the present disclosure, it is assumed that an I bit of 0 in a time slot indicates that the data in the remainder of the time slot represents circuit switch information. It is further assumed that an I bit of 1 in a time slot specifies that the time slot contains packet switch data. Thus, each and every time slot as seen at the output of the multiplexer contains the bits generated by the circuit switch or the packet switch plus the I bit that is inserted in accordance with the present invention. In the present disclosure, a PCM sample that is generated by the circuit switch is assumed to contain eight bits of information and a byte of packet data is also assumed to contained eight bits from either source to indicate the nature of the information represented by the eight bits. The I bit insertion circuitry also generates and adds a parity bit to each time slot. This results in a time slot having 10 bits.

The economics of digital circuit design at the present time is such that it is preferable to process data using elements that have a bit length and bit width that can be expressed by $2^n$ where n is an integer. Thus, it is preferable to transmit time slots having $2^n$ bits. Eight is such a number and it is typical to transmit time slots having 8 bits. Ten is not such a number and, while it is theoretically possible to transmit 10 bit time slots, the circuitry for performing this function has substantial economic penalties associated with it. Therefore, an aspect of the present invention is the provision of circuitry that forms the 10 bit time slots into a subframe containing 32 bits. Thirty-two is a number that can be expressed by $2^n$. This subframe is combined with other subframes to form a frame having $2^n$ subframes. The number of bits in each subframe and in each frame can be expressed by $2^n$ and can be efficiently accommodated by the devices and processing techniques commercially available.

The receiving end circuitry of the present invention includes a circuit switch for receiving the time slots containing circuit switch information. It further includes a packet switch for receiving the time slots containing packet data. Interface circuitry is provided at the receiving end immediately ahead of the packet switch and the circuit switch to monitor each received time slot, to determine the value of the I bit in each received time slot and then to permit the packet switch or the circuit switch to receive the contents of a time slot depending upon whether the I bit specifies packet switch or circuit switch traffic, respectively. The inclusion of the I bit in the transmitted time slot provides a simple and effective mechanism for advising the receiving end circuitry as to the type of traffic currently served by the time slot.

The receiving end circuit switch interface contains a 1 by n memory, where n is equal to the number of time slots in a frame, which is kept up to date with information indicating the type of traffic currently served by each time slot. This 1 by n memory receives information via a transmitted packet message received by the receiving end packet switch specifying any changes in the assignment of any time slot to a particular type of traffic. Whenever a change in time slot assignment occurs, the transmitting end packet switch receives information from the transmitting end circuit switch regarding the change. This information is formatted into a packet message which is transmitted to the receiving end. The receiving end packet switch receives this message and applies it to the circuit switch interface which updates the contents of its n by 1 memory. This memory is time slot driven and it reads out the contents of its location unique to the current time slot. The readout information, a 0 or a 1, is applied to one input of an exclusive OR gate. The other input of the OR gate receives the I bit contained in the currently transmitted time slot. The comparison of these two bits by the exclusive OR gate provides an error detection mechanism to insure that the I bit contained in the transmitted time slot is valid.

BRIEF DESCRIPTION OF THE DRAWINGS

These and other advantages of the invention may be better understood from a reading of the following description taken in conjunction with the drawings in which:

FIGS. 3 and 4, when arranged is shown in FIG. 5 disclose one possible exemplary embodiment of the invention;

FIG. 6 discloses further details of the serial formator of FIG. 3; and

FIG. 1 diagrammatically discloses a system that embodies the principals of the present invention. The system of FIG. 1 includes a transmitter 101 and a receiver 121. The transmitter 101 is connected to circuit switch 102 and packet switch 103 and comprises controller 104, multiplexer 105, I bit and parity bit inserters 110 and 111 together with conductors 106, 107, 108, 109, 112 114, and 116. The function of transmitter 101 is to combine information received from circuit switch 102 and packet switch 103 together into separate time slots of a TDM signal comprising a repetitive series of cyclically reoccurring frames with frame comprising a plurality of discrete time slots. As is subsequently described, multiplexer 105 is operated on a time slot driven basis by controller 104 to apply either information from circuit switch 102 or packet switch 103 to TDM path 109.

Figure 1:
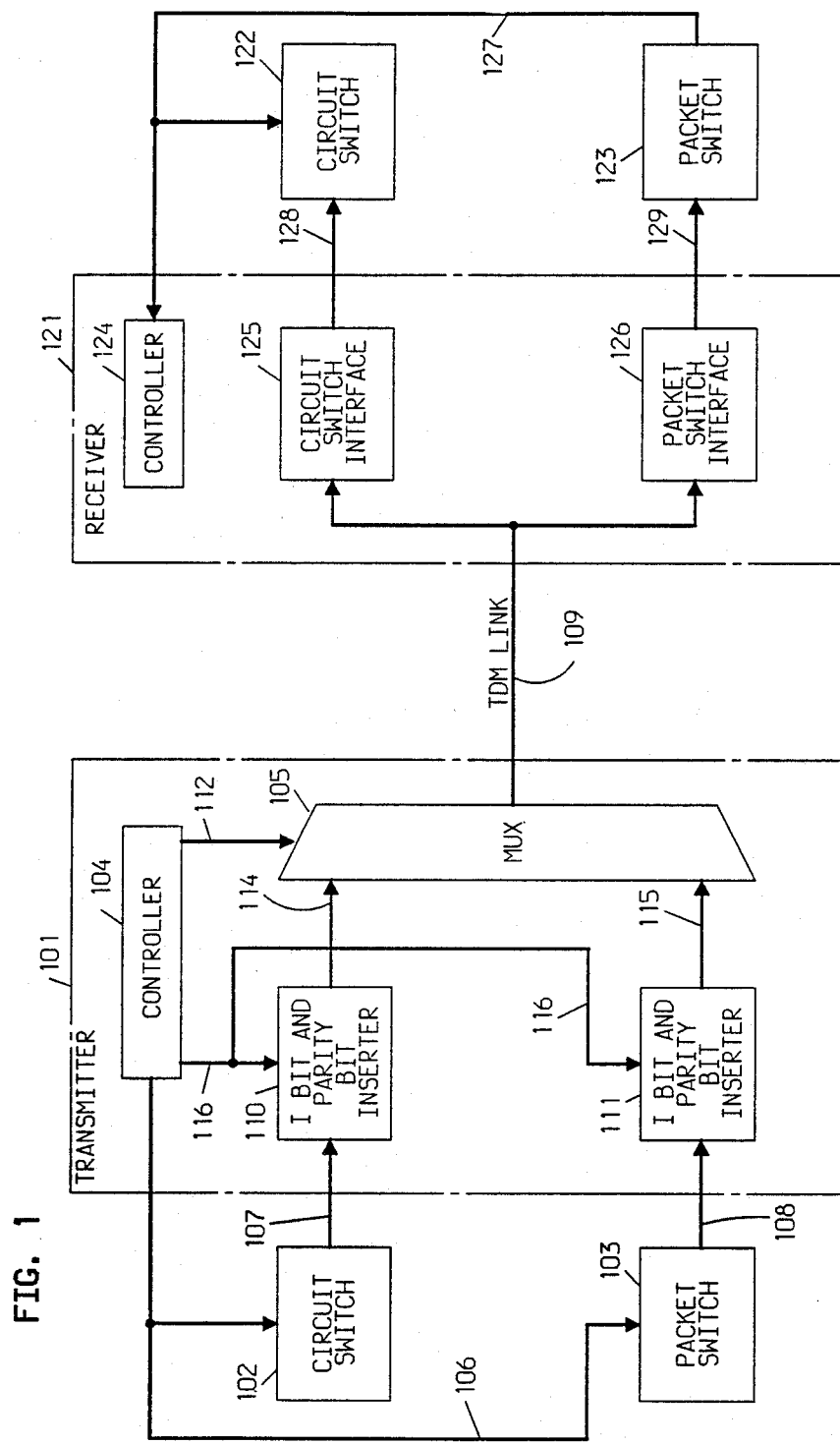
FIG. 1 discloses a system embodying the principals of the present invention.

The function of receiver 121 is to receive the TDM signal on path 109 and apply the contents of each time slot either to circuit switch 122 or the packet switch 123 depending upon whether the time slot is assigned to the serving of circuit switch or packet switch traffic.

The circuit switch 102 is advantageously of the stored program pulse code modulation (PCM) time division type and this switch applies a TDM signal to path 107 with typically some, but not all, of the time slots of each TDM frame containing circuit switch information. The remainder of the time slots, those not containing circuit switch information, may be termed idle time slots insofar as circuit switch 102 is concerned. Circuit switch 102 communicates via path 106 with controller 104 and keeps controller 104 updated with information indicating which time slots on path 107 are presently serving circuit switch traffic and which time slots are idle. Controller 104 is operated on a time slot by time slot basis and performs two functions. The first function is to control multiplexer 105 via path 112 so that input 114 of multiplexer 105 is active during the occurence of each time slot serving circuit switch traffic. Controller 104 also causes input 115 of the multiplexer to be active during the occurrence of each time slot not serving circuit switch traffic. The second function of controller 104 is to control the operation of the I bit inserters 110 and 111 via path 116. As is subsequently described, transmitter 101 causes an I-bit and a parity bit to be added to and transmitted with each time slot over path 109 with the value of the I bit indicating whether the contents of the time slot represent circuit switch or packet switch information.

During the occurrence of each time slot containing circuit switch information, controller 104 causes input 114 of the multiplexer to be active so that this input is then effectively connected to the multiplexer output 109 which comprises a TDM link extending to receiver 121. Controller 104 also controls the operation of I bit inserter 110 so that additional bits, an I bit and a parity bit, are added to the bits of each PCM sample received from circuit switch 102 on path 107. Each PCM sample received from circuit switch 102 for a time slot contains 8 bits and is applied over path 107 to I bit inserter 110. The I bit inserter 110 operates under control of controller 104 and adds an I bit and a parity bit to the received 8 bit PCM time slot on path 107. The resultant time slot applied from the output of the inserter 110 on path 114 contains 10 bits. These 10 bits are the original 8 bit PCM sample from circuit switch 102, a parity bit, and an I bit which functions to indicate whether the contents of the time slot represent circuit switch or packet switch information. This 10 bit time slot is then applied via multiplexer 105 and over TDM path 109 to receiver 121.

Controller 104 makes the TDM link 109 available for the serving of packet switch data during each occurrence of any time slot on path 107 that is not presently being used by the circuit switch 102. Time slots not presently being used by circuit 102 are herein termed idle time slots. Controller 104 makes input 115 of multiplexer 105 active during each occurrence of each idle time slot so that input 115 and the output of I bit and parity bit inserter 111 are then effectively connected to TDM link 109. Packet switch 103 applies a byte of data waiting to be transmitted during the occurrence of each idle time slot over path 108 to I bit and parity bit inserter 111. If no packet data byte is waiting to be transmitted during an idle time slot, then packet switch 103 will apply a "flag" or "null" byte over path 68 to I bit inserter 111. This packet data or flag byte is shown to comprise 8 bits of information in the present disclosure. The I bit and parity bit inserter 111 receives this 8 bit byte from the packet switch during each idle time slot and adds a parity bit together with an I bit to the 8 bit byte received over path 108. The resultant 10 bits are applied over path 115 and through the multiplexer 105 to the TDM link 109 for transmission to receiver 121.

The TDM signal on link 109 comprises a series of time slots with each time slot representing circuit switch information if that time slot is then being used by circuit switch 102. Each time slot that is not being used by circuit switch 102 may contain a byte of packet data if packet switch 103 then contains any data waiting to be transmitted to receiver 121. Each time slot also contains a parity bit together with an I bit specifying whether the contents of the time slot represents circuit switch or packet switch information. As is subsequently described, a time slot may also contain a flag character if the time slot is not then being used by the circuit switch 102 and if the packet switch 103 contains no information waiting for transmission to receiver 121.

Receiver 121 receives the TDM signal from link 109 and applies the contents of each time slot to either circuit switch 122 or to packet switch 123 in accordance with the type of traffic then being served by the time slot. The contents of each time slot on path 109 are applied to circuit switch interface 125 and packet switch 126. Circuit switch interface 125 analyzes the I bit of each received time slot and passes the remainder of each such time slot, except for the parity bit, to circuit switch 122 if the contents of the time slot represents circuit switch information. Similarly, packet switch interface 126 analyzes the I bit of each received time slot and passes the remainder of a time slot, except for the parity bit, to packet switch 123 if the contents of the time slot as specified by the I bit, represent packet information. The circuit switch 122 and packet switch 123 are both connected over path 127 to controller 124. This path permits these elements to communicate with one another to coordinate their operation. Packet switch 123 receives information from transmitter 101 and circuit switch 102 via path 109 regarding the type of service to which each time slot is currently assigned. Packet switch 123 receives this information and passes it over 127 to controller 124.

In summary of the operation of FIG. 1, the present invention provides facilities whereby each idle time slot not being used by a circuit switch 102 is available to serve any packet data waiting to be transmitted. The invention also provides simplified facilities in the form of I bit and parity bit inserters 110 and 111 which add a special bit to each time slot to indicate to receiver 121 the type of traffic served by the time slot. The immediate availability of each idle time slot for the serving of packet data provides an effective wide band link for the transmission of packet data using all idle time slots. The simplified I bit control mechanism indicates the nature of the information represented by each time slot to receiver 121.

DESCRIPTION OF FIGS. 3 AND 4

Figure 3:
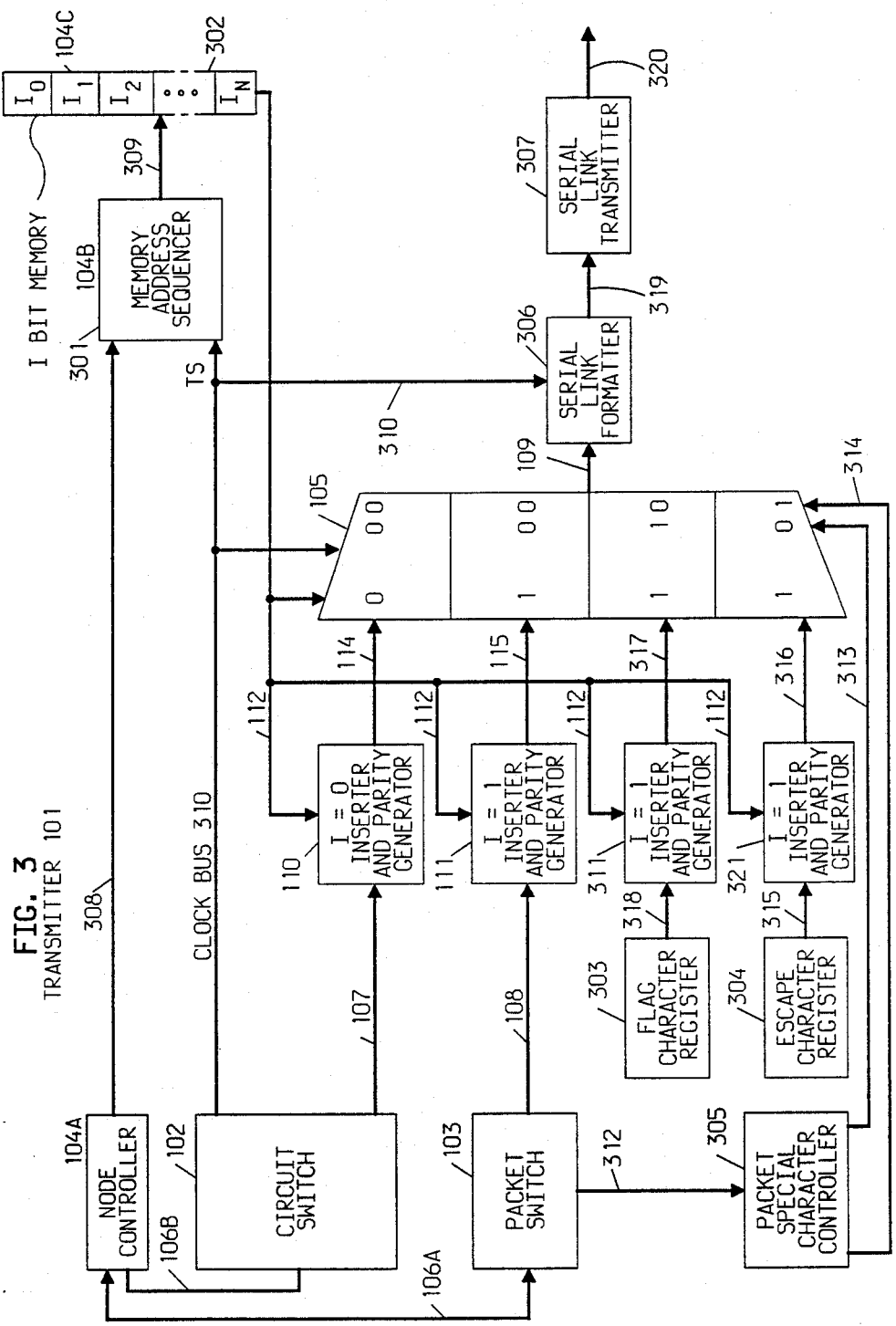

FIGS. 3 and 4 disclose further details of the system of FIG. 1. FIG. 3 discloses further details of transmitter 101. FIG. 4 discloses further details of receiver 121. The elements of FIG. 3 that directly correspond to elements on FIG. 1 are similarly designated. For example, circuit switch 102 is similarly designated on both FIGS. 1 and 3. Elements on FIG. 3 which do not have a direct one for one correspondence with an element on FIG. 1 are designated with numbers in the 300 series. Similarly, elements on FIG. 4 that directly correspond to an element on FIG. 1 are designated with the same number as on FIG. 1. Such is the case for packet switch 123. Elements on FIG. 4 that do not have a direct correspondence to an element on FIG. 1 are designated with a number in the 400 series.

Conductors 106A and 106B of FIG. 3 combined generally correspond to conductor 106 FIG. 1. Elements 104A, 104B and 104C together generally correspond to element 104 of FIG. 1.

Circuit switch 102 of FIG. 3, in the same manner as described for FIG. 1, applies to path 107 a TDM signal comprising cyclically reoccurring frames and subframes having time slots with each time slot containing an 8 bit PCM sample if that time slot is currently being used by circuit switch 102. Alternatively, circuit switch 102 applies nothing or an idle character to a time slot if that time slot is not currently being used by the circuit switch. Such a time slot is said to be idle. Circuit switch 102 also applies the necessary clock and timing signals to the conductors of bus 310 to control the operation of the system of FIG. 3 including memory address sequencer 104B and to control multiplexer 105. Circuit switch 102 advises node controller 104A over path 106B as to which time slots are being used by the circuit switch on path 107 and which time slots are currently idle. Node controller 104A may be a microprocessor controlled device and it applies information over path 308 to memory address sequencer 104B to control the writing and reading of the n by one memory 104C. Memory 104C contains a position unique to each time slot on path 107 and sequencer 104B keeps memory 104C updated with information regarding the type of service assigned to each time slot. At any time, memory 104C is written with a 1 or a 0 in each of its locations depending upon the type of service the time slot associated with the location is serving. Sequencer 104B also controls the reading of memory 104C so that the contents of the memory location individual to a time slot are read out and applied to path 112 during the occurrence of the time slot. Each time slot, insofar as sequencer 104B and memory 104C are concerned is divided into two parts, a read cycle an a write cycle. During the read cycle, sequencer 104B causes the memory 104C location to be read out that is unique to the present time slot. During the write cycle, sequencer 104B may update the memory location for the present time slot with any new information representing a change in the type of service to which the time slot is assigned. The write cycle occurs before the read cycle for each time slot.

Path 112 extends to the I=0 inserter and the parity generator 110 as well as to elements 111, 311, and 321. The presence of a 0 in the memory 104C location then being read out applies as 0 to path 112 and causes inserter 110 to add an I bit of zero and a parity bit to the 8 bit time slot then received from circuit switch 102 on path 107. The resulting 10 bit signal and path 114 represents circuit switch information for the time slot since the I bit is 0 at this time. Conductor 112 also extends to one of the address inputs of multiplexer 105 and it controls the left most address bit as shown on FIG. 3. The other two address inputs for the multiplexer are conductors 313 and 314 and they supply the middle and the right most address bits to the multiplexer on FIG. 3. A 0 on conductor 112 during the occurrence of a time slot supplies an address bit of zero to the left most address position of the multiplexer. This 0 by itself, irrespective of the state of conductors 313 and 314, causes multiplexer 105 to activate its upper input 114 so that path 114 is effectively connected to the multiplexer output on path 109. This is the state of the multiplexer during each occurrence of a time slot currently serving circuit switch information as signified by a 0 in the associated location of memory 104C.

In summary so far, memory 104C contains a 0 in each location unique to a time slot serving circuit switch information. This 0 is read out during the occurrence of each such time slot and applied to path 112. The 0 on path 112 causes an I bit of 0 and a parity bit to be added to the PCM sample on path 107 so that a 10 bit time slot signal is applied to path 114. Input 114 of multiplexer 105 is active upon the receipt of the 0 on path 112 so that the 10 bit sample on path 114 is applied to the output of the multiplexer on path 109. From there, as is subsequently described in detail, the 10 bit time slot is extended over path 320 to the circuitry of FIG. 4.

Each location of memory 104C unique to an idle time slot contains a 1. During the occurrence of each idle time slot a 1 is read out of memory 104C and applied to path 112. A 1 on path 112 selects one of the three lower positions of multiplexer 105 and causes inserters 111, 311 and 321 to generate an I bit of 1 together with a parity bit. The signals on address conductors 313 and 314 are significant when the left most address bit from conductor 112 is a 1. At such times, the signals on conductors 313 and 314 determine which of the lower most three inputs of the multiplexer are active. Let is be assumed for the time being that conductor 313 and 314 supply address bits 0 so that an address of 100 is received by multiplexer 105 on its three address leads. This causes the input 115 of the multiplexer to be active.

Packet switch 103 is advised over path 106A as to which time slot is currently active and the type of service to which the active time slot is assigned. If an active time slot is idle, packet switch 103 is so advised and it reads out and applies to path 108 one byte of any data then waiting to be transmitted. This 8 bit byte is received by the I=1 inserter and parity generator 111 which adds an I bit of one and a parity bit to the 8 bit byte and applies the resultant 10 bits signal to path 115. This input of the multiplexer is now active so that the 10 bit signal is extended to output 109 of the multiplexer and from there over elements 306, 319, 307 and 320 to the circuitry of FIG. 4.

In partial summary of the operation described so far regarding FIG. 3, memory 104C reads out a 0 or a 1 from its location unique to the presently active system time slot with a 0 representing circuit switch service and with a 1 representing packet service. The reading out of the 0 activates the upper input 114 of multiplexer 105 so that a 10 bit time slot containing an I bit of 0 corresponding to circuit switch service is extended through the multiplexer to its output 109. Similarly, a 1 in the memory location unique to the presently active time slot indicates that the time slot is idle and available to transmit any packet data that may be waiting for transmission within packet switch 103. Packet switch 103 reads out this byte and extends it over path 108 to element 111 which adds a parity bit and and I bit of 1 to form a 10 bit time slot which is extended over path 115 and through multiplexer 105 to its output 109.

Packet switch 103 transmits signals over path 312 to control packet special character controller 305 whose outputs are paths 313 and 314. These paths supply the middle and right most address bits to multiplexer 105. These paths both supply address bits of 0 when the packet switch contains one or more bytes of data waiting to be transmited to the receiver of FIG. 4. At such times, input 115 of the multiplexer is active if the present time slot is idle so that the waiting packet byte may be transmitted together with an I bit of 1 and a parity bit through multiplexer 105 to its output 109. If packet switch 103 contains no data waiting to be transmitted when an idle time slot becomes available, the packet switch 103 signals controller 305 over path 312 to generate address bits of either 10 or 01 on paths 313 and 314 respectively. This causes input 317 of multiplexer 105 to be active for address bits of 110 or input 316 to be active for address bits of 101. The activation of multiplexer input 317 causes an 8 bit flag character together with an I bit of one and a parity bit to be extended through multiplexer 105 to its output 109. The activation of input 316 causes a special escape character and an I bit of 1 together with a parity bit to be extended through multiplexer 105 to its output 109.

The signals applied to path 109 on FIG. 3 are extended through elements 306, 307 of FIG. 3 to serial channel receiver 401 on FIG. 4. From there, they are extended over path 412 to output register 411 within the time slot formatter and clock recovery element 402. Elements 306 and 402 are subsequently described in detail in connection with FIGS. 5 and 6, respectively.

The 10 bit time slots received by output register 411 correspond to the 10 bit time slots applied to path 109 of FIG. 3 during each time slot. The bits shown in register 411 are comprised of a parity bit P, eight data bits D0-D7, and the identity bit I. From register 411, the 10 bit time slots are applied over path 109 on FIG. 4 to register 424 within circuit switch interface 125 and also to register 403 within packet switch interface 126. Register 411 receives, but does not transmit out, the parity bit and thus path 109 on FIG. 4 applies a 9 bit signal to register 403 and 424 during each time slot.

Special character recognizer 405 and FIFO controller 404 together cooperate to apply the 8 data (D0-D7) bits within register 403 to FIFO 406. Such is the case when the I bit in register 403 is a 1 to indicate packet switch service provided that the 8 data bits of register 403 do not represent a flag character or an escape character.

In summary, FIFO 406 receives 8 bits of packet data during the occurrence of a system time slot providing that the time slot is serving packet switch data and also providing that the data within the time slot is not either a flag or a special character. If the data is a flag or special character, this situation is detected by special character recognizer 405 which signals FIFO controller 404 over path 414 to prevent the data within register 403 from being applied to FIFO 406. FIFO controller 404 controls this function over path 416 which causes the input of FIFO 406 to be either enabled or disabled depending upon the nature of the signal on path 416. When the I bit of register 403 is a 0 indicating circuit switch information, a disable signal is applied to FIFO 406 to prevent circuit switch information from being erroneously written into FIFO 406.

The successively received packet data bytes are stored within FIFO 406. The FIFO is periodically read out and the readout data entered into via path 129 packet switch 123.

Circuit switch interface 125 and its register 424 receives the same 8 data bits together with the I bit that are entered into register 403. The 8 data bits in register 424 are applied to circuit switch 122 over path 128 once per time slot. Since circuit switch 122 is a processor controlled device it knows which of its time slots are currently serving circuit switch information and which of its time slots are idle. Circuit switch 122 thus reads the current contents of register 424 during each occurrence of a time slot currently assigned to the serving of circuit switch information. Circuit switch 122 ignores the data bits in register 424 during the occurrence of time slots associated with packet switch service.

Elements 407, 408, 409, 410 and 124 provide an error checking mechanism which verifies the I bits transmitted during each time slot to register 424. The operation of this error checking facility is described in the subsequent paragraphs. Packet switch 123 periodically receives a packet message from transmitter 101 of FIG. 3 whenever a change is made concerning the allocation or deallocation of a time slot for a circuit switch connection. This packet information is applied over path 127 to node controller 124 and circuit switch 122. Node controller 124 passes this information over path 420 to memory address sequencer 410, which is similar to memory address sequencer 301, to cause memory 408 to be updated with information regarding the type of service to which each system time slot is assigned. This information is stored in memory 408 with each memory location being unique to a different system time slot. Each location stores either a 0 or 1 depending upon whether its related time slot is serving circuit switch or packet switch information, respectively.

Memory 408 is read out once during each time slot and the read out contents are applied over path 418 to the upper input of the exclusive OR gate 407. The lower input of gate 407 concurrently receives a signal on path 417 signifying the value of the transmitted I bit in register 424.

If the system is operating properly, the I bit on path 417 should correspond to the I bit on path 418. In this case, the output of the exclusive OR gate 407 is a 0 which is applied over path 419 to the circuit switch. This 0 advises the circuit switch that the two I bits correspond. Conversely, if the I bit on path 417 does not correspond to that on path 418, then a 1 is applied by the OR gate to circuit 122 switch over path 419 to advise the circuit switch that the value of the transmitted I bit is not consistent with the corresponding I bit of I-bit table 408. The circuit switch, being a program controlled device, may then alter its mode of operation to respond in the appropriate manner or it may notify the transmitter of the inconsistency.

The value of the I bit path 417 may be an erroneous 0 indicating erroneously that the data bits in register 424 represent circuit switch information when they actually represent packet information. Circuit switch 122, in this case, must take the appropriate steps to insure it does not respond to packet data thinking it is circuit switch data. Conversely, the erroneous I bit on path 417 may be a 1 while the data bits in register 424 may represent circuit switch 122 is to determine that it should respond to the 8 data bits even though the erroneous I bit on path 417 is a 1. The manner in which the circuit switch responds to I bit errors on path 419 does not comprise a portion of this invention and is not discussed in further detail.

Figure 2:
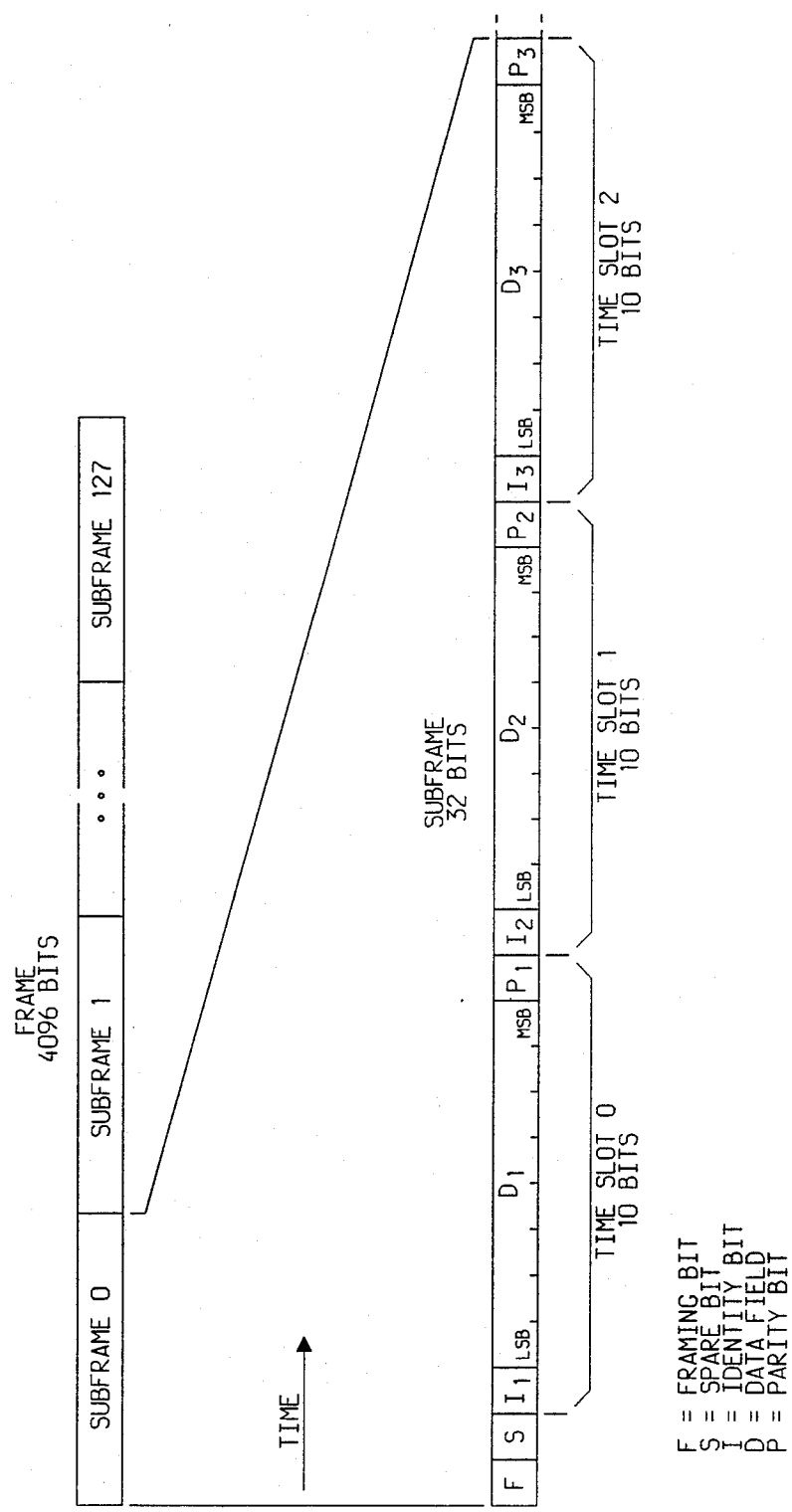
FIG. 2 illustrates the manner in which the present invention forms time slots into subframes and frames.

FIG. 6 discloses further details of the serial link formatter 306 of FIG. 3. The function of formatter 306 may be best understood with reference to FIG. 2. The function of formatter 306 is to receive the 10 bit time slots shown in the lower portion of FIG. 2 and to group three successive time slots together and insert these into a 32 bit subframe for transmission to the circuitry of FIG. 4.

It has been priority explained that the presently available digital processing devices are adapted most efficiently to process groups of bits in such a manner that the number of bits forming each group should be equal to $2^n$ where n is an integer. Examples of such groups are 1, 2, 4, 8, 16, 32, 64, 128 . . . . The 10 bit time slots provided at the output of multiplexer 105 do not represent a number of bits that can be most efficiently processed and therefore the circuitry of FIGS. 3 and 4 do not communicate with one another by transmitting 10 bit time slots from FIG. 3 to FIG. 4. Instead, three consecutive time slots are grouped together as shown on the bottom of FIG. 2. Three such time slots comprise 30 bits. To these 30 bits are added a framing (F) bit and a spare (S) bit so as to constitute a subframe having 32 bits. The number 32 equals $2^n$ and a group of 32 bits can efficiently be processed by the presently available data processing hardware and storage devices. the 32 bit subframes are formed into frames containing 128 subframes designated 0 through 127 on the top of FIG. 2. The circuitry of FIG. 6 discussed in the following paragraphs performs the function of forming 10 bit time slots into 32 bit subframes and, in turn, into frames having 128 subframes.

On FIG. 6 the 10 bit time slots are received on path 109 and applied to null time slot inserter 601. The function of this device is to add a null 10 bit time slot to the reception of each three time slots on path 109 from multiplexer 105. Element 601 performs this function and applies to path 606 the group of time slots shown as elements 602, 603, 604 and 605. Elements 605, 604 and 603 represent the first three received time slots on path 109. There are the time sots generated by multiplexer 105. Following the reception of these three time slots, element 601 then generates a null time slot shown as element 602. The null time slot is generated and temporarily used to avoid the need for the complex circuitry and clock signals which would work on multiples of three instead of the much simpler circuitry and clock signals which work on powers of 2. The resulting group of four time slots, as well as succeeding groups of similarly formed groups of four time slots, is applied over a path 606 to element 607 which performs a serial to parallel time slot conversion and applies its output to path 608. The parallel format of the four time slots is shown as element 608A. The output of path 608 is applied to the subframe latch 609 which applies the parallel output representing time slot 1, time slot 2 and time slot 3 to path 610. The output of the null time slot is applied over path 611 to the null time slot extractor 612. The three parallel time slots on path 610 are applied to element 613 which performs a frame and spare bit insertion function to form a 32 bit subframe comprising a framing bit, a spare bit, and the three 10 bit time slots.

The resulting 32 bit wide signal on path 614 is applied to multiplexer 615 which performs a parallel to serial conversion and applies the 32 bit subframe serially to path 319. With reference to FIG. 3, the serial bit stream on path 319 is applied to serial link transmitter 307 which applies a serial output signal over path 320 to the serial channel receiver 401 of FIG. 4.

Figure 7:
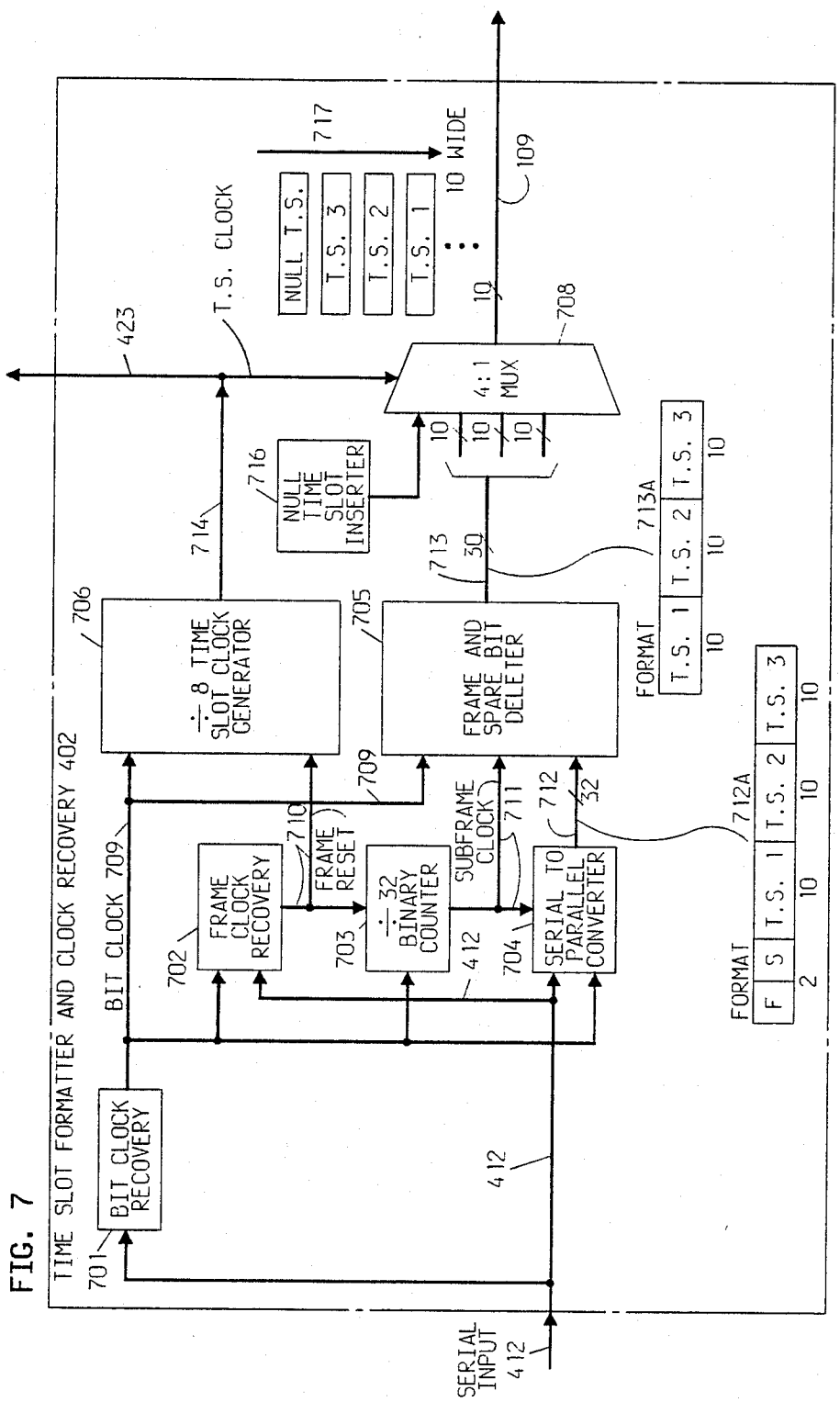
FIG. 7 discloses further details of the serial channel receiver of FIG. 4.

Receiver 401 receives the serial signal on path 320 and applies its output over path 412 to the time slot formatter and clock recovery element 402 whose details are shown in further detail on FIG. 7.

Various elements on FIG. 6 are connected to clock bus 310 extending from FIG. 3 which controls the timing of these elements on FIG. 6 so that the circuitry of FIG. 6 performs its intended function.

FIG. 7 discloses further details of the time slot formatter and clock recovery element 402 of FIG. 4. Elements on FIG. 7 that have a one for one correspondence with an element on FIG. 4 are identically designated. Such is the case for input conductor 412. Elements on FIG. 7 that are not identical or otherwise shown on FIG. 4 are designated with a reference numeral in the 700 series.

The overall function of the circuitry of FIG. 7 is to receive the serial bit stream on its input conductor 412 and to convert this serial bit stream into 10 bit parallel time slots which are applied to its output conductor 109 one time slot at a time.

The serial bit stream on input path 412 is applied to bit clock recovery element 701, to frame clock recovery element 702 and to the serial to parallel converter 704. The serial signal on input conductor 412 represents the sequentially transmitted frames of information with each frame comprising 128 subframes as shown on the top part of FIG. 2. Each subframe comprises three 10 bit time slots together with a framing bit and a spare bit for a total of 32 bits for the subframe as shown on the lower portion of FIG. 2.

The input serial stream on path 412 is applied to bit clock recovery element 701 which derives the embedded bit clock from the serial input signal. The derived bit clock is applied over path 709 to the frame recovery element 702. It is further applied to the divide by 32 binary counter 703, to the serial to parallel converter 704, to the divide by 8 time slot clock generator 706, and to the frame and spare bit detector 705.

The serial input stream 412 is also applied to the frame clock recovery element 702 which derives the embedded frame clock from the serial signal 412. The derived frame clock on path 710 is applied to the divide by 32 binary counter 703 as well as to the divide by 8 time slot clock genertor 706. The serial input stream 412 is also applied to the serial to parallel converter 704 which also receives the subframe clock signal on path 711 from the divide by 32 binary counter 703. The serial to parallel converter 704 converts each group of 32 successively received bits into a parallel subframe format shown by element 712A.

The frame clock recovery 702 applies a frame clock pulse at the beginning of every frame to path 710. This frame clock pulse resets the divide by 32 binary counter element 703. Counter element 703 then counts each group of 32 successively received bit clock signals and applies an output signal to path 711 whenever 32 successive bits have been counted. This output signal comprises a subframe clock which is applied over 711 to the serial to parallel converter 704 to enable it to convert 32 successively received bits representing a serial subframe into a parallel output on path 712 having the format shown for element 712A.

The parallel subframe signal on path 712 is applied to the frame and spare bit deleter 705. This element also receives the subframe clock on path 711 and functions to delete the frame and spare bits in the first two positions of the subframe so that a 30 bit wide output signal is applied to path 713 representing the three 10 bit time slots comprising the subframe.

The divide by 8 time slot clock generator 706 receives the bit clock signal on path 709 and the frame reset signal on path 710. Generator 706 responds to the receipt of these two signals and generates a time slot clock signal which is applied over conductor 714 to the control input of the four to one multiplexer 708. This signal causes the multiplexer to sequentially activate each of its four inputs.

The 30 bit wide path 713 is divided into three groups of 10 conductors each with the three groups of conductors being connected to the three lower inputs of multiplexer 708. The upper input of multiplexer 708 is connected over path 715, to null time slot inserter 716.

As earlier mentioned, it is commercially expedient to design and operate devices such as multiplexers with their clock signals and inputs being characterized as $2^n$ where n is an integer. Thus, in order to avoid operating multiplexer 708 with three inputs, it is operated with four inputs with the fourth input being the upper input and being connected to null time slot inserter 716. The multiplexer receives the time slot clock signal on path 423 and, upon the receipt of each such clock signal, sequentially activates one of its four inputs. The sequential operation or activation of the lower three inputs successively applies the three transmitted time slots, time slot 1, time slot 2 and time slot 3, of each subframe to the 10 bit wide output conductor 109. The null time slot from element 716 is applied to path 109 following the application of the third time slot of the subframe. This mode of operation permits the multiplexer to be controlled by a time slot clock that is readily derivable, either indirectly or directly from the serial bit stream on path 412.

The four time slots that are sequentially applied to path 109 are applied as shown on FIG. 4 to register 424 of the circuit switch interface 125 and to register 403 of the packet switch interface 126. The first three time slots, TS1, TS2 and TS3, are processed and ultimately received either by circuit switch 122 or by packet switch 123 depending upon the value of the I bit in the time slot. The fourth time slot, the null time slot, has an I bit of 0. It is received but not processed by circuit switch 122.

The time slot clock signal on path 714 is applied to path 423 which on FIG. 4 extends to packet switch interface 126 and to time slot counter 409 to control their operation.

What is claimed is:

1. Apparatus for transmitting a first and a second type of information over a time multiplexed bus, said apparatus comprising:
   a source of information of a first type for generating a signal comprising cyclically reoccurring frames with each of said frames having a plurality of time slots and with a first type of information being contained in certain ones of said time slots with the remainder of said time slots being idle,
   means for storing information specifying which of said time slots currently contain said first type of information and which of said time slots are currently idle,
   a source of information of a second type,
   means controlled by said storing means for transmitting said first and second types of information over said bus by inserting currently extant information of said second type into any of said currently idle time slots so that all of said idle time slots are used to transmit any extant information of said second type, and
   means for inserting an identity bit into each transmitted time slot specifying the type of information represented by other bits of the time slot.

2. The apparatus of claim 1 wherein said means controlled by said storing means comprises a multiplexor having a first input for receiving said signal containing said first type of information and a second input for receiving said second type of information, and
   an output on said multiplexor,
   said storing means being effective controllably to connect said output to said first and second inputs, respectively, during occurrences of time slots serving said first and said second types of information, respectively.

3. The apparatus of claim 2, wherein said first type of information comprises circuit switch information and wherein said second type of information comprises packet information.

4. Apparatus for transmitting circuit switch and packet information over a time multiplexed bus, said apparatus comprising:
   a circuit switch information source for generating a time multiplexed signal comprising cyclically reoccurring frames of information with each of said frames having a plurality of time slots and with said circuit switch information being contained in certain ones of said time slots with the remainder of said time slots being idle,
   means for storing information specifying which of said time slots currently contain said circuit switch information and which of said time slots are currently idle,
   a source of packet information,
   means controlled by said storing means for transmitting said circuit switch and said packet information over said bus by inserting currently extant packet information into said currently idle time slots so that all of said idle time slots are used to transmit any extant packet information, and
   means for inserting an identity bit into each transmitted time slot specifying the type of information represented by other bits of the time slot.

5. The apparatus of claim 4 wherein said means controlled by said storing means comprises a multiplexor having a first input for receiving said time slot multiplexed signal from said circuit switch and a second input for receiving said packet information, and
   an output on said multiplexor connected to said bus,
   said storing means being effective controllably to connect said output to said first and second inputs, respectively, during occurrences of time slots serving said circuit switch and said packet information, respectively.

6. Apparatus for transmitting a first and a second type of information over a time multiplexed bus, said apparatus comprising:
   a source of a first type of information for generating a signal comprising cyclically reoccuring frames with each of said frames comprising a plurality of time slots and with said first type of information being contained in certain ones of said time slots with the remainder of said time slots being idle,
   a source of information of a second type,
   combining means,
   means for controlling said combining means to transmit said first and second types of information over said bus by insertng currently extant information of said second type into any of said currently idle time slots so that all of said idle time slots are used to transmit any extant information of said second type, and
   means for inserting identity information into each time slot specifying the type of information represented by the information in the remainder of said time slot.

7. The apparatus of claim 6 wherein said combining means comprises a multiplexor having a first input for receiving signal containing said first type of information and a second input for receiving said second type of information, and
   an output on said multiplexor,
   said multiplexor being effective controllably to connect said output to said first and second inputs, respectively, during occurrences of time slots serving said fist and said second types of information, respectively.

8. The apparatus of claim 7 wherein said first type of information comprises circuit switch information and wherein said second type of information comprises packet information.

9. Apparatus for transmitting circuit switch and packet information over a time multiplexed bus, said apparatus comprising:
   a circuit switch information source for generating a time multiplexed signal comprising cyclically reoccurring frames of information with each of said frames comprising a plurality of time sots and with said circuit switch information being contained in only certain ones of said time slots with the remainder of said time slots being idle, a source of packet information, combining means, means for controlling said combining means to transmit said circuit switch and packet information over said bus by inserting currently extant packet information into said currently idle time slots so that all of said idle time slots are used to transmit any extant packet information, and means intermediate said combining means and said first and second sources of information for inserting identity information into each time slot representing the type of information represented by the information in the remainder of said time slot.

10. The apparatus of claim 9 wherein said combining means comprises a multiplexor having a first input for receiving said time slot multiplexed signal from said circuit switch and a second input for receiving said packet information, and an output on said multiplexor connected to said bus, said combining means being effective controllably to connect said output to said first and second inputs, respectively, during occurrences of time slots serving said circuit switch and said packet information, respectively.

11. The apparatus of claim 9 wherein said means for transmitting said circuit switch and said packet information over said bus comprises:

means for forming n of said time slots containing said inserted identity information into subfrmes having $2^{n1}$ bits where n1 is an integer.

12. The apparatus of claim 9 in combination with receiving apparatus for receiving said information transmitted over said bus, said receiving apparatus comprising:

a circuit switch interface and a packet switch interface, means for applying bits of each transmitted time slot to each of said interfaces, means in said packet switch interface for determining from said inserted identity information whether the other bits of each time slot comprise circuit switch or packet switch information, a receiving packet switch and a receiving circuit switch, means for extending the bits of a received time slot to said receiving packet switch only if said inserted information indicates that the other bits of said time slot comprise packet information, and means in said circuit switch interface for extending to said circuit switch the bits of each received time slot representing circuit switch information.

13. The apparatus of claim 12 in combination with apparatus in said circuit switch interface comprising:

a receiving memory having a location individual to each time slot of a frame received on said bus, means for writing an indication in each receiving memory location specifying whether the time slot individual to each said location is currently assigned to serve said circuit switch information or said packet information, means effective during each occurrence of each of said time slots for reading out the contents of said receiving memory location individual to each said time slot, means effective during each occurrence of each of said time slots for applying said read out contents of said receiving memory to a comparator, and means for applying said inserted identity information of each received time slot to said comparator, said comparator being responsive to the receipt of said identity information and from the receipt of said readout contents of said memory to indicate a correspondence or non-correspondence between said received information and said readout contents.

14. The apparatus of claim 13 in combination with:

means for inserting message information into successive occurrences of one of said transmitted time slots with said message information specifying which of said time slots are serving said circuit switch information and which of said time slots are serving said packet information, means in said receiving apparatus for receiving said message information, and means responsive to the receipt of said message information for writing into said receiving memory information specifying the type of information that is being served by each of said time slots received by said receiving apparatus.

15. A method of operating apparatus for transmitting a first and a second type of information over a time multiplexed bus, said method comprising the steps of:

(1) generating a signal comprising cyclically reoccurring frames with each of said frames having a plurality of time slots and with a first type of information being contained in certain ones of said time slots with the remainder of said time slots being idle, (2) transmitting said first and second types of information over said bus by inserting currently extant information of said second type into any of said currently idle time slots so that all of said idle time slots are used to transmit any extant information of said second type, and (3) inserting an identity bit into each transmitted time slot specifying the type of information represented by other bits of the time slot.

16. A method of operating apparatus for transmitting circuit switch and packet information over a time multiplexed bus, said method comprising the steps of:

(1) generating a time multiplexed signal comprising cyclically reoccurring frames of information with each of said frames comprising a plurality of time slots and with said circuit switch information being contained in only certain ones of said time slots with the remainder of said time slots being idle, (2) controlling a combining means to transmit said circuit switch and packet information over said bus by inserting currently extant packet information into said currently idle time slots so that all of said idle time slots are used to transmit any extant packet information, and (3) inserting identity information into each time slot representing the type of information represented by the information in the remainder of said time slot.

17. The method of claim 16 wherein said step of transmitting said circuit switch and said packet information over said bus comprises the step of:

forming n of said time slots containing said inserted identity information into subframes having $2^{n1}$ bits where n1 is an integer.

18. The method of claim 16 in combination with a method of operating receiving apparatus for receiving said information transmitted over said bus, said last named method comprising the steps of:
  (1) applying bits of each transmitted time slot to a circuit switch interface and to a packet switch interface,
  (2) operating said packet switch interface for determining from said inserted identity information of each time slot whether the other bits of said time slot comprise circuit switch or packet switch information,
  (3) extending the bits of a received time slot to a receiving packet switch only if said inserted information indicates that the other bits of said time slot comprise packet information, and
  (4) extending to a receiving circuit switch the bits of each received time slot representing circuit switch information.

19. The method of claim 18 in combination with a method of operating said circuit switch interface said method comprising the steps of:
  (1) writing an indication in each location of a receiving memory having a location individual to each received time slot with said indication specifying whether the time slot individual to each said location is currently assigned to serve said circuit switch information or said packet information,
  (2) reading out the contents of said receiving memory location individual to each said received time slot during each occurrence of each received time slot,
  (3) applying said read out contents of said receiving memory to a comparator during each occurrence of each of said received time slot, and
  (4) applying said inserted identity information of each time slot to said comparator,
  said comparator being responsive to the receipt of said identity information and from said memory to indicate a correspondence or non-correspondence between said received information and said readout contents.

20. The method of claim 19 in combination with the steps of:
  (1) inserting meassage information into successive occurrences of one of said transmitted time slots with said message information specifying which of said time slots are serving said circuit switch information and which of said time slots are serving said packet information,
  (2) operating said receiving apparatus to receive said message information, and
  (3) writing information into said receiving memory responsive to the receipt of said message information specifying the type of information that is being served by each of said time slots received by said receiving apparatus.

21. Apparatus for transmitting a first and a second type of information over a time multiplexed bus, said apparatus comprising:

means for receiving signal comprising cyclically reoccurring frames of information with each of said frames having a plurality of time slots and with a said first type of information being contained in certain ones of said time slots with the remainder of said time slots being idle,
  means for storing information specifying which of said time slots are currently idle,
  means controlled by said storing means for inserting currently extant information of said second type into any of said currently idle time slots, and
  means for inserting an identity bit into each time slot specifying the type of information represented by other bits of the time slot.

22. The apparatus of claim 21 wherein said means controlled by said storing means comprises a multiplexor having a first input for receiving said signal containing said first type of information and a second input for receiving said second type of information,
  an output on said multiplexor, and
  said storing means being effective controllably to connect said output to said first and second inputs, respectively, during occurrences of time slots serving said first and second types of information, respectively.

23. The apparatus of claim 22 wherein said first type of information comprises circuit switch information and wherein said second type of information comprises packet information.

24. Apparatus for transmitting circuit switch and packet information over a time multiplexed bus, said apparatus comprising:
  means for receiving a time multiplexed signal comprising cyclically reoccurring frames of information with each of said frames comprising a plurality of time slots and with said circuit switch information being contained in only certain ones of said time slots with the remainder of said time slots being idle,
  combining means,
  means for controlling said combining means to insert currently extant packet information into said currently idle time slots, and
  means for inserting identity information into each time slot representing the type of information represented by the information in the remainder of said time slot.

25. The apparatus of claim 24 wherein said combining means comprises a multiplexor having a first input for receiving said time slot multiplexed signal containing said circuit switch information and a second input for receiving said packet information,
  an output on said multiplexor, and
  said combining means being effective controllably to connect said output to said first and second inputs, respectively, during occurrences of time slots serving said circuit switch and said packet information, respectively.

* * * * *